United States Patent [19]

Petiet

[11] 3,709,354
[45] Jan. 9, 1973

[54] POSITIONING DEVICE FOR CONICAL SUBJECTS

[75] Inventor: Jakobus Petiet, Leiden, Netherlands

[73] Assignee: N. V. Leidsche Apparatenfabriek, Leiden, Netherlands

[22] Filed: Sept. 17, 1970

[21] Appl. No.: 73,164

[30] Foreign Application Priority Data

Sept. 17, 1969 Netherlands ........................ 6914108

[52] U.S. Cl. ................. 198/33 AA, 221/156, 198/25
[51] Int. Cl. ........................... B65g 47/24, B65h 9/00
[58] Field of Search ....198/33 AA, 25; 221/156, 172, 221/164, 165, 166, , 167, 169, 170

[56] References Cited

UNITED STATES PATENTS 3,269,514  8/1966  Daniels et al. .................... 198/33 AA

*Primary Examiner*—Harvey C. Hornsby
*Assistant Examiner*—H. S. Lane
*Attorney*—Fleit, Gipple & Jacobson

[57] ABSTRACT

Apparatus for transferring substantially conical subjects of an elastic material, such as truncated caps for bottles of a plastic material from a supply container into a store holder in a predetermined position comprising a horizontal shaft mounted to said apparatus, a plurality of parallel rotatable discs mounted on said shaft and positioned at a distance from each other greater than the larger diameter of the conical subjects. The inner walls of the discs are provided with means to temporarily hold the conical subjects near their larger diameter. The rotatable discs are able to rotate simultaneously with such a velocity that the conical subjects held thereby are positioned by centrifugal forces with their smaller diameter directed outward. Means are also provided for continuously removing the positioned conical subjects and for moving the conical subjects to the store holder.

6 Claims, 3 Drawing Figures

POSITIONING DEVICE FOR CONICAL SUBJECTS

The invention relates to apparatus for transferring substantially conical subjects of an elastic material, such as truncated conical caps for bottles of a plastics material from a supply container into a store holder in a predetermined position.

In capsulating bottles, especially plastic bottles, conically shaped screw caps of a plastic material are being used with more frequency. These screw caps have to be delivered from a supply container via a cap store holder to removing means passing below the store holder. The removing means, during passage below the store holder, picks up a cap and conveys it to an automatic bottle closing device. Conical caps of plastic material, having a height generally larger than the larger diameter are picked up from the store holder in the same predetermined position.

Presently known devices for positioning caps generally suffer from the disadvantage in that the conical caps can only be delivered in small or very small amounts.

The principal object of the invention is to provide a device which can automatically position conical plastic caps and can deliver the caps from a supply container in the desired amounts. This object is attained by the invention by transferring substantially conical subjects of an elastic material, such as truncated conical caps for bottles of a plastic material from a supply container into a store holder in a predetermined position. The apparatus comprises a pair of parallel discs rotable in a supply container around a horizontal shaft and positioned at a mutual distance somewhat greater than the larger diameter of the conical subjects. The inner walls of the discs are provided with means which can temporarily hold the conical subjects near their larger diameter. The discs can rotate simultaneously with such a velocity that the conical subjects held thereby are positioned by centrifugal forces with their smaller diameter outward. Means is also provided for continuously positioning the conical subjects and for transferring the conical subjects to the store holder.

By the use of centrifugal forces, it is possible to deliver large numbers of conical plastics caps in a predetermined position, since, by the greater peripheral speed of the discs, a considerably greater number of caps can pass through the discs.

A preferred embodiment of the invention comprises a device of the disclosed type, in which the means for holding the conical subjects near their larger diameter comprises a profile of the inner walls of the discs near their edges forming an opening between the discs. The smaller distance between the inner walls' profiles being smaller than the larger diameter of the conical subjects and larger than the smaller diameter of the conical subjects. The discs are connected to one another at their inner walls by a great number of arms positioned at regular distances along the circumference of the discs. The arms are provided with catch pins protruding perpendicularly from their middle beyond the circumference of the discs. During rotation of the discs in the supply container, conical subjects lying below the horizontal center line of the pair of discs, are picked up by the catch pins. By a relatively quick rotation of the discs, centrifugal forces act upon the caps picked up, so that, by their combination of position of the center of gravity and the possible movability between the discs, the caps are held, at their larger diameter, by the profile of the inner walls of the discs, while the caps are positioned with their smaller diameter in a radially outward direction. The conical subjects positioned thus by the discs can be drawn from the opening between the discs by suitable means, while further suitable means can transfer the caps, still in their predetermined positions, to a store holder.

A further preferred embodiment of the invention comprises a device in which the means for continuously removing the conical subjects held between the discs comprise a pair of parallel rollers continuously rotatable around a horizontal shaft parallel with the shaft of the discs. The rollers are placed at a small distance from the circumference of the discs and above the horizontal centerline thereof, with the vertical plane of symmetry of the rollers coinciding with the vertical plane of symmetry of the discs. The edges of the rollers are provided with flanges of a resilient material, which extend over the circular path of the parts of the conical subjects protruding beyond the circumference of the discs, with the flanges being placed at a distance equal to the smaller diameter of the conical subjects.

The caps picked up by the discs are held therebetween at their larger diameter and are directed outwardly beyond the discs. The caps are moved by the discs to the rollers and arrive there with their parts beyond the discs positioned between the resilient flanges of the continuously rotating rollers and are held by the resilience of those flanges since the flanges are spaced from one another at a width equal to the smaller diameter of the caps, so that the caps are drawn from the discs by the rollers. The caps thus held between the flanges of the rollers are moved to a store holder having an entrance at the periphery of the rollers substantially opposite to the location where the rollers are closest to the discs. Thus, all conical subjects are transferred to the store holder in one and the same predetermined position.

According to the invention, a suitable apparatus is provided by an embodiment, in which the profile of the inner walls of the discs near their edges is shaped so that the opening formed between the discs is partially formed by tapered protrusions in he direction of the circumference of the discs, the smaller distance between the protrusions thereof being equal to the diameter of the conical subjects below their larger diameter. The protrusions pass into a wider part having parallel walls spaced at a distance somewhat smaller than the greater diameter of the conical subjects, as seen in the direction of rotation of the discs. Before the conical subjects reach the means for removing the conical subjects from between the discs, a device is present for drawing the conical subjects from a first part of the opening between the discs, into the second wider part thereof, so that the conical subjects, at the location of their greater diameter, become held between the parallel wall parts, and the remaining parts of the conical subjects protrude beyond the circumference of the discs.

In this embodiment, the caps picked up by the discs are first positioned with their smaller section radially outward, while the section of larger diameter is held between the first part of the opening between the discs.

In this manner they are brought in a predetermined position. Therefore, the caps are brought into such position that they can be removed from the opening between the discs in an efficient manner without exertion of excessive forces. After first bringing the caps into the predetermined position, the caps are further drawn outward by suitable means in such a manner that only the edges of the caps are retained between the parallel parts of the walls at the edges of the discs and are held in such a manner that the subjects are not flung out from the discs by centrifugal forces, with the result that the holding force is sufficiently low to allow the withdrawal of the subjects from between the discs by the rollers.

Suitable apparatus according to the invention is obtained by an embodiment of the above kind, in which the device for drawing the conical subjects from the first part of the opening between the discs into the second wider part thereof, comprises a pair of freely movable rolls placed around substantially vertical shafts near the circumference of the discs at some distance from each other at both sides of the path of the conical subjects protruding radially from the discs. The smallest distance between the rolls is smaller than the diameter of that part of the conical subjects which passes between the rolls, the rolls being located below the discs some distance past the vertical centerline of the discs as seen in the direction of rotation.

The conical subjects picked up by the discs are first brought in a predetermined position by centrifugal forces whereby the broader upper parts of the caps are held between the narrowing opening of the discs and the smaller parts of the subjects protrude beyond the discs, and pass with their smaller parts between the rolls present below the discs. The rolls, since their mutual distance is smaller than the diameter of that part of the subjects passing between the rolls, give the subjects an elastic deformation. The subjects, since the rolls, as seen in the direction of rotation of the discs, are placed past the vertical centerline of the discs, are drawn downwardly, upon further movement of the discs, in such a manner that the upper larger diameter edges of the subjects become held between the parallel parts of the walls at the edges of the discs, and the discs move the thus positioned subjects to the means for drawing the subjects from the discs.

The invention thus provides apparatus for automatically transferring conical subjects from a supply container in a predetermined position to a store holder, so that the conical subjects are delivered in considerably greater numbers than known devices are able to do. The apparatus according to the invention can deliver up to, e.g., 30,000 subjects in 1 hour.

IN THE DRAWINGS

The invention will be discussed now in more detail with the aid of the attached drawings in which.

Figure 1:
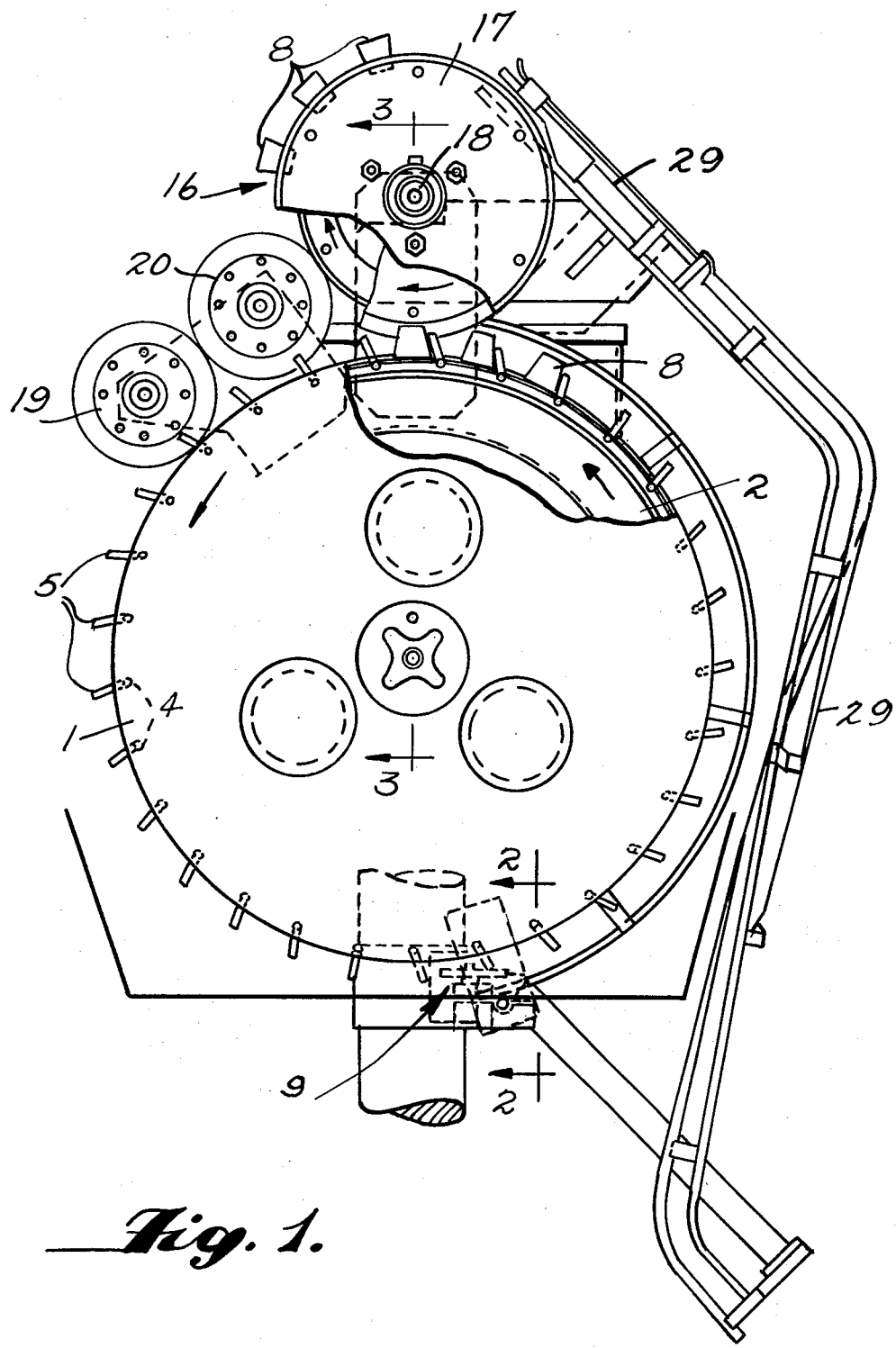
FIG. 1 shows a front view of a positioning device according to the invention.
Figure 2:
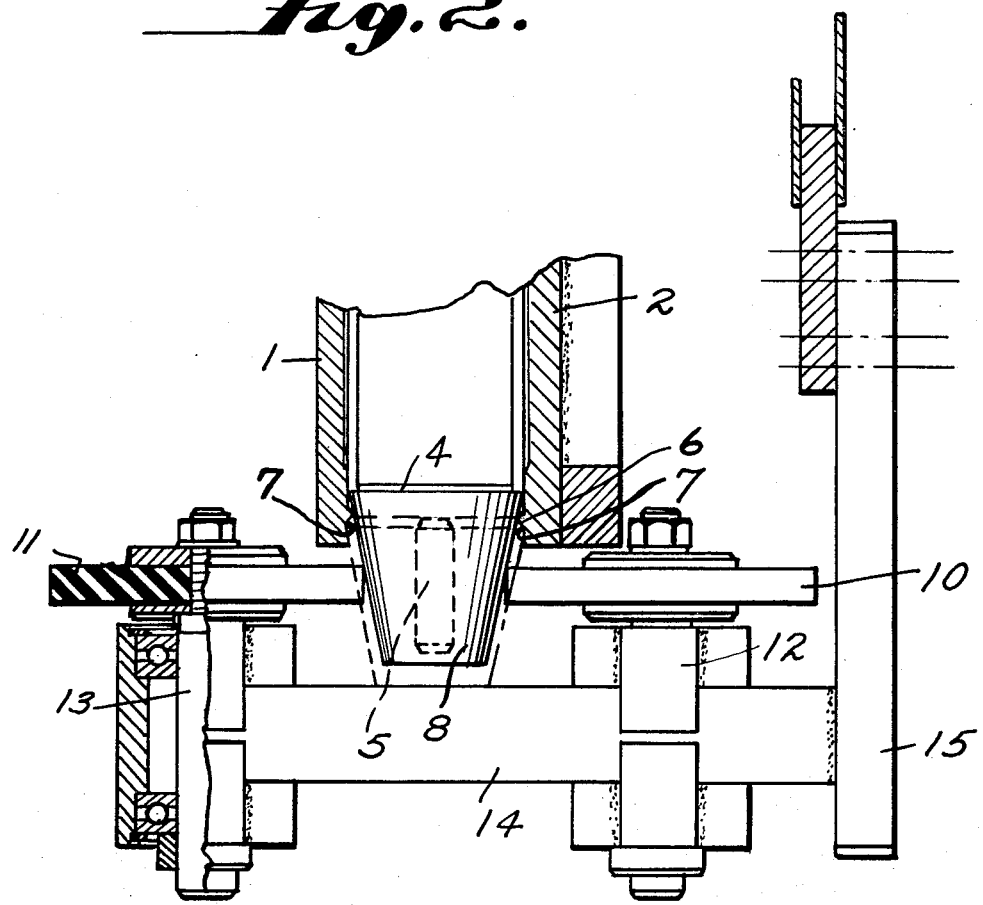
FIG. 2 shows a section along the line II — II of the device shown in FIG. 1.
Figure 3:
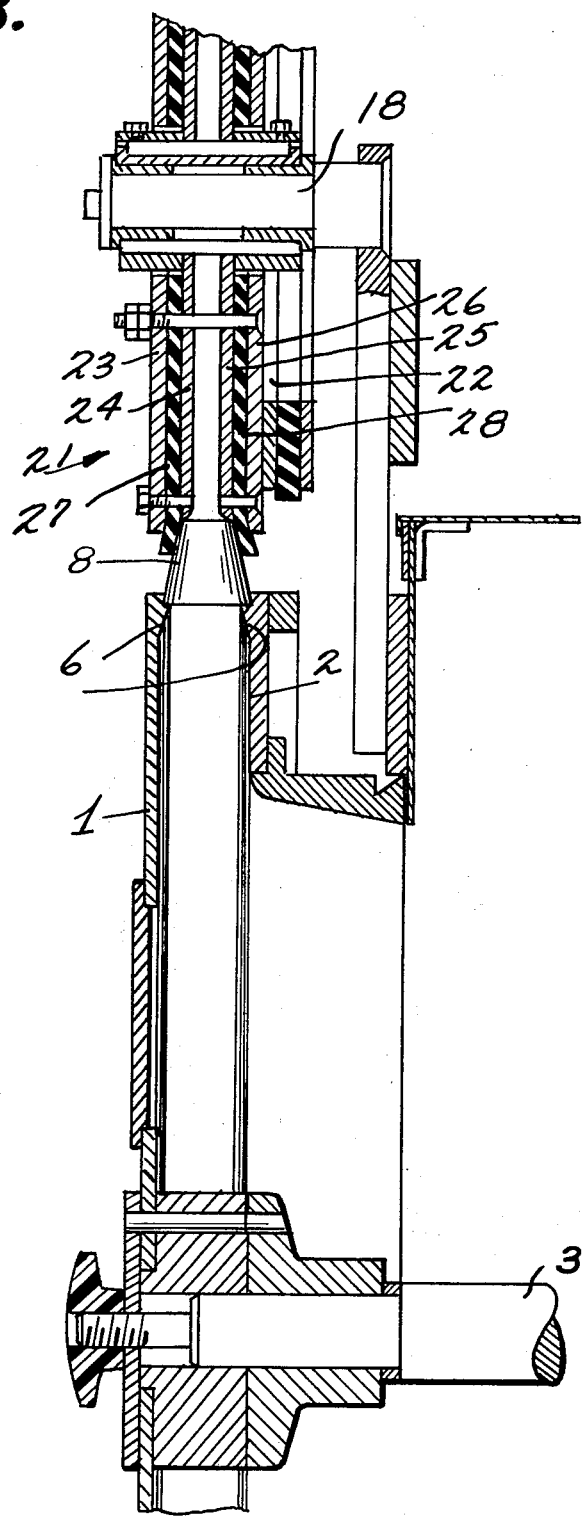
FIG. 3 shows a section along the line III — III of the device shown in FIG. 1.

The apparatus shown in FIG. 1 comprises a pair of discs 1 and 2, which are mounted a predetermined distance from one another and parallel to each other on a horizontal shaft 3. The discs 1 and 2 rotate in the direction indicated in FIG. 1, through a supply hopper (not shown) filled with conical plastic bottle caps. The discs 1 and 2 are placed at a distance from each other somewhat greater than the larger diameter of the conical caps, with the inner walls of the discs being connected by arms 4 at regular mutual distances arranged from the edges along the circumference of the discs 1 and 2. The arms 4 are provided with catch pins 5 which protrude perpendicularly from the middle of the arms 4 beyond the circumference of the discs. The inner walls of the edges of the discs are provided each with a profile 6 so that the smallest distance between the profiles 6, placed opposite to each other, is smaller than the larger diameter of the conical caps. The profiles 6 pass, in the direction of the circumference, into a wider part of opposite wall parts 7 of the opening formed by the protrusions, the distance therebetween being somewhat smaller than the larger diameter of the conical caps, as is shown by FIG. 2. The profiles 6 are suitably shaped as tapered protrusions as shown in FIG. 1.

The discs 1 and 2 are rotated at a relatively high speed through the caps in the supply container, with the caps being picked up by the arms 4 with catch pins 5. By the rotation of the discs, centrifugal forces act on the screw caps picked up, so that by the combination of position of the center of gravity and the possible movability between the discs, the caps are positioned with their larger upper part held by the profiles 6 and with their remaining part directed radially outwardly. In FIG. 2, a cap 8 is illustrated in that position by drawn lines. Thus, by means of the discs 1 and 2, the caps 8 arrive at a device 9 below the discs 1 and 2 at a distance from the circumference thereof and, as seen in the direction of rotation of the discs, at a distance past the vertical centerline of the discs 1 and 2. The device 9 is illustrated in more detail in FIG. 2, and comprises a pair of rolls 10 and 11 placed freely movable around vertical shafts 12 and 13, respectively, at a distance from each other at both sides of the path of the caps 8. The distance of the circumference of the rolls is such that the smallest distance between the rolls' edges is somewhat smaller than the diameter of that part of the caps 8 passing therebetween, so that when caps 8 pass between the rolls 10 and 11, they are elastically deformed. The caps 8 are held by the rolls 10 and 11 for a short time, and are radially compressed, while the discs 1 and 2 are still moving, so that the caps are drawn from the profiles 6 and become held by their upper edges between the parallel parts 7 of the edges of the discs 1 and 2. In this position, the caps are moved upwardly by the discs 1 and 2. The forces exerted on the caps by the parallel parts 7 is just enough to prevent the caps from being thrown out from the opening between the discs by centrifugal forces, while allowing the caps 8 to be removed by small forces from the space between the discs (see interrupted lines in FIG. 2) by means 16 placed above the discs 1 and 2.

The means 16 comprises a roller means 17 situated on the vertical centerline of the discs, which can rotate around a horizontal shaft 18 driven by two friction wheels 19 and 20, respectively. The roller means 17 comprises two rollers 21 and 22 shaped in reverse or in mirror view. The rollers 21 and 22 consist each of two roller discs 23, 24 and 25, 26, respectively. Between each pair of roller discs 23, 24 and 25, 26, rubber plates 27 and 28, respectively, are clenched. The rubber plates extend about 1 cm beyond the roller discs 23, 24 and 25, 26. The roller means 17 is placed above the discs 1 and 2 at such a distance to allow the extending edges of the rubber plates to be over the circular path of the radially protruding caps 8, with the mutual distance of the rubber plates being equal to the smaller diameter of the plastic caps 8. The caps brought into the predetermined position by the discs 1 and 2, are picked up from those discs by the extending edges of the rubber plates 27 and 28, and delivered to a cap store holder 29, and through the store holder to a predetermined position to the supply plate of a bottle closing machine. The location of the roller means and the connection with the store holder are selected so that when the store holder is filled up with caps and the machine does not remove caps from the store holder, the caps supplied in predetermined position will be forced to roll back into the supply container.

It is noted that the invention is not restricted to the above-described device, as various modifications may be applied to the device without falling outside the scope of the invention.

What is claimed is:

1. An apparatus for transferring substantially conical subjects of an elastic material such as truncated conical caps for bottles of a plastic material from a supply container into a store holder in a predetermined position, comprising a shaft, a pair of parallel rotatable discs mounted to said shaft and positioned at a distance from each other greater than the larger diameter of the conical subjects, the inner walls of the discs being provided with means to temporarily hold the conical subjects near their larger diameter, said discs being further provided with means for picking up the conical caps, said rotatable discs being able to rotate simultaneously through a hopper of the supply container from which the conical subjects are located between the rotatable discs and are positioned by centrifugal forces with their smaller diameter directed outward, means for continuously removing the positioned conical subjects and means for transferring the conical subjects to said store holder.

2. Apparatus as claimed in claim 1, wherein the means for holding the conical subjects near their larger diameter comprises a profile on the inner walls of each disc near its edges, the smallest distance between the opposed ends of the profiles being smaller than the larger diameter of the conical subjects and larger than the smaller diameter of the conical subjects, said discs being connected to each other at their inner walls by a plurality of arms positioned at regular distances along the circumference of the discs, said arms being provided with catch pins protruding perpendicularly from the middle of said arms beyond the circumference of the discs.

3. Apparatus as claimed in claim 1, wherein the means for continuously removing the positioned conical subjects comprises a shaft parallel to said disc shaft, a pair of parallel rollers rotatable around said shaft, said rollers being placed at a distance from the circumference of said discs above the horizontal centerline thereof, the vertical plane of symmetry of said rollers coinciding with the vertical plane of symmetry of said discs, said rollers having edges provided with plates of resilient material, said plates extending from said roller edges over the circular path of the parts of the conical subjects protruding beyond the circumference of said discs, said plates being spaced from each other at a distance equal to the smaller diameter of said conical subjects.

4. Apparatus as claimed in claim 1, wherein the profiles of the inner walls of the said discs near their edges are shaped so that an opening defined by the discs is partially formed by tapered protrusions in the direction of the circumference of the discs, the smaller distance between the profiles being equal to a diameter of the conical subjects below their larger diameter, each of said protrusions passing into a second part so that the opposing profiles form parallel walls spaced wider apart than the first part at a distance somewhat smaller than the greater diameter of the conical subjects, said apparatus also including a device for drawing the conical subjects from the first part of the opening between the discs where it becomes smaller, into the second wider part thereof, so that the conical subjects, at the location of their greater diameter, become held between the parallel wall parts, with the remaining parts of the conical subjects protruding beyond the circumference of the discs.

5. Apparatus as claimed in claim 4, wherein the device for drawing the conical subjects from the first part of the opening between the discs into the second wider part thereof, comprises a pair of rolls mounted to substantially vertical shafts near the circumference of the discs, said rolls being freely movable at a distance from each other at both sides of the path of the conical subjects protruding radially from the discs, the distance between the rolls' edges being smaller than the diameter of that part of the conical subject which passes between the rolls, said rolls being located below the discs some distance past the vertical centerline of the discs.

6. Apparatus as claimed in claim 1 wherein the inner walls of the discs are shaped in a way such that a conical subject between the discs, after being pushed at its left and right side, is located with its greater diameter between the discs so that the conical subject does not fall away from between the inner walls.

* * * * *